July 31, 1962   J. M. M. NEUFVILLE ETAL   3,047,724
DEVICE FOR SUPPLYING A SHIP WITH ELECTRICAL ENERGY
Filed Jan. 6, 1960
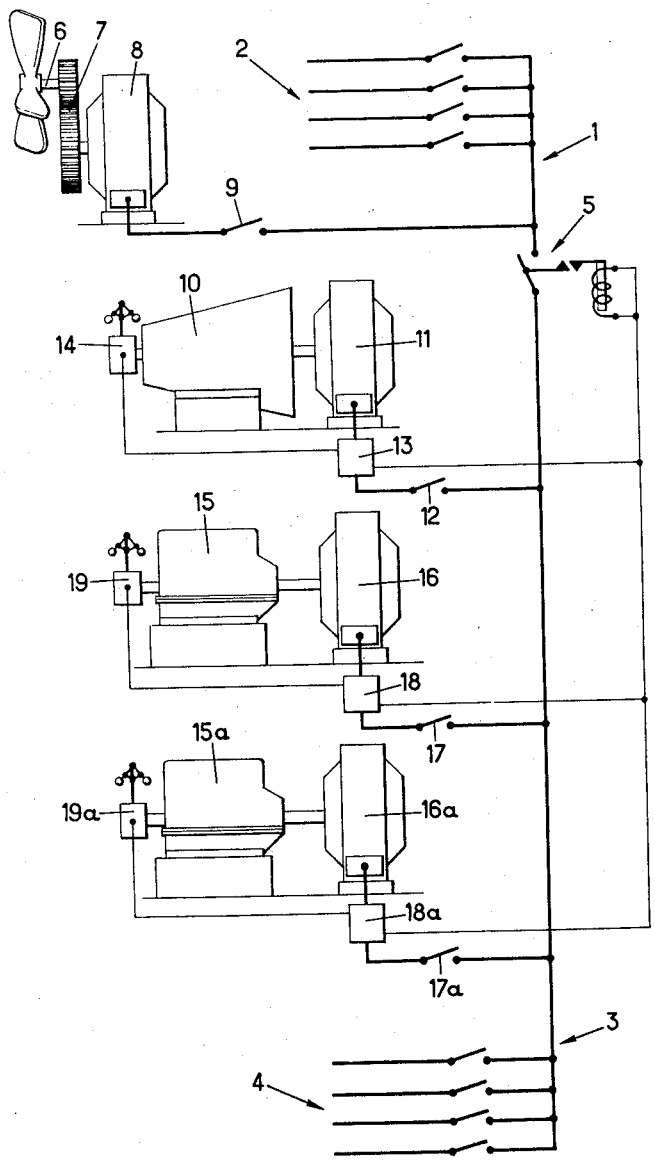
INVENTORS
J. M. M. Neufville
J. E. Trottier
By *[signature]*
ATTORNEYS

United States Patent Office 3,047,724
Patented July 31, 1962

3,047,724
DEVICE FOR SUPPLYING A SHIP WITH
ELECTRICAL ENERGY
Jean Marie Marcel Neufville, 17 Rue Borghese, and
Jean Emile Trottier, 128 Ave. du Roule, both of
Neuilly-sur-Seine, France
Filed Jan. 6, 1960, Ser. No. 2,092
Claims priority, application Luxembourg Jan. 9, 1959
7 Claims. (Cl. 290—4)

It is well known that the efficiency of thermal engines increases substantially as a function of the power thereof and that, for this reason, various devices have been designed by means of which a ship may be supplied with electrical energy from generators driven by the propeller shaft when the ship runs at a cruising speed, in order to take also advantage, as to the electrical energy, of the high efficiency of the propelling engines of the ship which are often very powerful diesel engines.

There has been in particular developed devices in which alternators rotating at a constant speed were driven from the propeller shaft by means of an electrical or mechanical speed variator. Such devices insure a very great flexibility in use and are quite satisfactory, but the price thereof is rather high.

The present invention aims to provide a device by means of which a ship may be supplied with electrical energy from the propeller shaft, such device being very sturdy and extremely simple, by deliberately accepting, in compensation of these two desired qualities, a less flexibility in use and by practically limiting the use of the device in the case where the ship is sailing on the high seas at a substantially constant speed.

In the device according to the present invention, the electrical energy necessary for the ship is partly supplied by an alternator connected to the propeller shaft and partly by an alternator driven by a steam turbine supplied with the steam produced by recovering the heat of the exhaust gases of the diesel engine which propels the ship.

An object of this invention is to provide a device supplying a ship with electrical energy, which is essentially characterized by the fact that it comprises in combination an alternator, having preferably a high reactance, driven from the propeller shaft, possibly through a speed reducing gear, and delivering its current to an electrical network for supplying the auxiliaries of the ship's propelling engine, and an alternator driven by a steam turbine (preferably supplied with the steam produced by recovering the heat from exhaust gases of the diesel propelling engine) and delivering its current to a network supplying the auxiliaries which are not indispensable to the operation of said propelling engine, the regulation of said turbine having a high statism, which is the slope of the characteristic curve of the regulation, i.e. the ratio $$\frac{n_1-n_2}{\frac{n_1+n_2}{2}}$$

where $n_1$ is the speed in a no load condition and $n_2$ is the speed at full load, and a wattmeter relay by means of which one of the alternators operates at a constant power, the network supplied by the alternator which is driven by the turbine and the network supplied by the alternator connected to the propeller shaft being electrically connected, so that the alternator driven by the propeller shaft assigns its frequency to the alternator driven by the steam turbine, a circuit breaker disconnecting said both networks when the speed of the propeller shaft would assign to the alternator of the turbine a frequency beyond the regulation range, the possible displacements of the adjustment point of the turbine governor being taken into consideration.

In a preferred embodiment of this invention one or more alternators are paralleled with the alternator driven by the steam turbine, and are driven by auxiliary engines, and the characteristics of their regulation are analogous to those of the regulation of the steam turbine which has been mentioned hereinbefore.

According to the present invention, when the ship is sailing on the high seas at a cruising speed, said both electrical networks are connected, and the electrical energy aboard is supplied jointly by the alternator connected to the propeller shaft and the alternator driven by the steam turbine, the frequency in the network varying slightly, but remaining in all cases proportional to the speed of revolution of the propeller shaft, such speed remaining, as it is known, substantially constant when the ship sails at a cruising speed, in the case where the sea is not exceptionally heavy, which would cause the propeller to momentarily emerge from the water.

In a first preferred embodiment of the present invention, a wattmeter governor measures the power delivered by the turbine-driven alternator and modifies accordingly the adjustment point of the speed governor of the turbine so as to cause said turbine to run at a substantially constant power. The function of this wattmeter governor is the more easy as, according to the present invention, the speed governor of the turbine has a high statism.

In the case of said first embodiment of this invention, the distribution of the load between the two alternators is effected as follows:

If, from a given equilibrium state of running in parallel, the speed of the alternator connected to the propeller shaft increases, such alternator accommodates a more important load, which reduces correspondingly the load on the turbine-driven alternator, but since the statism of the governor of this turbine is high, the wattmeter governor acts quickly and causes the rate of the turbine to rise rapidly, so that the latter accommodates again the load assigned thereto.

Conversely, if the speed of the alternator driven from the propeller shaft is reduced, the power delivered by this alternator is also reduced and that of the turbine-driven alternator must increase correspondingly, but the action of the wattmeter relay results in lowering very rapidly the running of the turbine, and thus the load thereof, and consequently it restores the desired equilibrium of parallel running.

In a second preferred embodiment of this invention, a wattmeter governor which is connected across the terminals of the alternator driven by the propeller shaft shifts the adjustment point of the governor regulatnig the speed of the steam turbine driving the other alternator, so that the power delivered by the alternator driven from the propeller shaft remains substantially constant.

In the case of this second embodiment of the present invention, the distribution of the load between the two alternators is affected as follows:

Since the alternator connected to the propeller shaft assigns its own frequency to the network, and since this alternator is driven by an engine the statism of which is practically null, if the network calls for a higher power, such excess of power is entirely supplied by the alternator driven by the propeller shaft, but the wattmeter relay acts immediately upon the adjustment point of the turbine governor to determine a greater admission of steam so as to cause the turbine alternator to accommodate the load excess and thus to relieve the alternator connected to the propeller shaft which operates again at the same power as previously.

Conversely, if the power demanded by the network is reduced, then the turbine-driven alternator is the only one to be relieved, but the wattmeter relay operates immediately to act upon the adjustment point of the steam turbine regulation in reducing the steam admission.

In the case where a variation occurs in the speed of the propeller shaft, and consequently in the frequency and the load of the alternator connected to the propeller shaft, then the wattmeter relay acts upon the steam admission to the turbine, so as to change the speed thereof, so that the alternator driven by the propeller shaft accommodates again its initial load.

In these two illustrative and by no means limitative embodiments of this invention, there can be said that the wattmeter relay behaves as an electrician who would have before him two wattmeters corresponding respectively to the load of the alternator driven by the propeller shaft and the load of the alternator driven by the turbine, and who would endeavour to maintain the pointer of one of said wattmeters registering with some scale mark corresponding to the constant power at which he desires to have one of these two alternators running.

It can be seen also that owing to the presence of the wattmeter relay and the high statism of the turbine regulation, the frequency of the alternator connected to the propeller shaft is indeed assigned to the turbine-driven alternator, the frequency of the current supplying the ship being then susceptible to vary in a range which is relatively narrow, such as for example of the order of 10%.

If for any reason the Command decided to reduce the speed of the ship, and consequently should the network frequency drop below the permissible minimum value, then a circuit-breaker cuts-off the above mentioned electrical networks.

The operation of said circuit-breaker may be made automatic by servoing the same to the stops limiting the regulation range of the wattmeter relay insuring the operation of one of the alternators at a constant mean power.

Thus, there can be seen that said both networks may be disconnected as soon as the frequency assigned by the alternator driven by the propeller shaft moves beyond the frequency range in which the regulation of the turbine may act.

As soon as both networks are disconnected, the turbine operates through its own regulation and continues to supply its network at a constant frequency, while the network supplied by the alternator connected to the propeller shaft operates at a frequency which is proportional to the speed of revolution of the propeller shaft.

Such a frequency variation is not very objectionable, since this network supplies only the auxiliaries indispensable to the operation of the diesel propelling engine, such auxiliaries comprising mainly lubricating pumps, fuel supply pumps, etc., the outputs of which vary substantially as the power delivered by the main diesel engine, which, in turn, varies as the speed of revolution of said engine. It can be then understood that a substantial lowering of the frequency is tolerable in this electrical network.

According to this invention, there is provided preferably at least one alternator driven by an auxiliary engine and capable to be electrically connected in parallel to the turbine-driven alternator which supplies the network having a constant frequency.

Adding said auxiliary engine is necessary in the case where the ship sails at a reduced speed, because, owing to the rate lowering of the main diesel engine, generation of the steam from said exhaust gases is substantially reduced and is no longer sufficient to deliver the power necessary to the steam turbine-driven alternator. Consequently, it is then indispensable to compensate this lack of power by means of an auxiliary engine that is started when needed.

Finally, in the case where the rate of the diesel propelling engine is reduced to the point that the corresponding frequency drop becomes out of the question, the alternator driven by the propeller shaft is disconnected from this network and the same is connected again to the network supplied with a substantially constant frequency by the turbine-driven alternator, by putting into operation, if necessary, an additional auxiliary engine to compensate the lack of power resulting from the disabling of the alternator driven by the propeller shaft.

Thus, there can be seen that the device according to the present invention is extremely simple and allows the delivering of the electrical energy of the ship in a manner particularly economical when the ship is sailing at a cruising speed, such energy being then supplied by the recovering of the heat of the exhaust gases of the propelling engine and complementary by an alternator connected to the propeller shaft, the frequency of this electrical current being very substantially constant, owing to the fact that the speed of revolution of the propeller shaft varies only slightly when the ship sails at a cruising speed.

It is also important, according to the present invention, that the alternator connected to the propeller shaft has a high reactance, said alternator being also preferably of the salient pole type.

In effect, it is well known that the variation in the propeller shaft speed has a cyclical component owing to the fact that the propelling engine is an engine having a connecting rod and crank drive, which determines in the speed of the alternator driven by the propeller shaft variations which have a relatively high frequency and a small amplitude (such frequency corresponding to the cyclical discrepancies in the propelling engine).

Owing to said cyclical discrepancies in the diesel propelling engine, the alternator driven by the propeller shaft must have a high reactance insuring a sufficiently loose electrical coupling between the diesel propelling engine and the network to which is connected the alternator fixed to the propeller shaft.

Speaking in a different manner, it can be said that the high reactance alternator plays, in the device according to the present invention, the part of an electrical damper which promotes keeping the parallel coupling upon instantaneous exchanges of power occurring between said alternators.

In order that this invention may be completely understood, an illustrative and by no means limitative embodiment thereof will be now described with reference to the annexed drawings, the single FIGURE of which is an electrical schematic representation of a device according to the present invention, wherein a wattmeter relay insures the operation of the steam turbine-driven alternator at a substantially constant power.

In the drawings, an electrical network 1 supplies the auxiliaries 2 indispensable to the operation of the diesel propelling engine, and an electrical network 3 supplies the auxiliaries which are not indispensable to the operation of said engine, and both networks may be interconnected by means of a circuit-breaker 5.

A propeller shaft 6 drives, through a speed reducing gear 7, an alternator 8 which is connected to the network 1 by means of a switch 9.

A steam turbine 10, which is operated by the steam produced by recovering the exhaust gases of the diesel engine driving propeller shaft 6, is connected to an alternator 11 which is connected to the network 3 by means of a switch 12.

A wattmeter relay 13 is connected on one side thereof to the speed governor 14 of the turbine 10, and on the other side of circuit-breaker 5.

Two auxiliary diesel engines 15 and 15a drive respectively two alternators 16 and 16a, which are connected to network 3 by switches 17 and 17a, respectively, and are provided with wattmeter relays 18 and 18a, respectively, connected to the speed governors 19 and 19a for the diesel engines 15 and 15a as well as to the circuit-breaker 5.

In normal running on the high seas, when the ship is moving at her cruising speed, the circuit-breaker 5 is closed, so as to interconnect networks 1 and 3. Switches 9 and 12 are also closed, but switches 17 and 17a are open. Under such conditions, the electrical energy necessary for auxiliaries 2 and 4 is supplied simultaneously by alternator 8 and alternator 11.

The wattmeter relay is such that when for any reason whatever the load on alternator 11 increases, said relay acts upon the governor to bring down the load on alternator 11 to the value assigned thereto, whereby the load variations in the network may be accommodated solely by alternator 8 driven from the propeller shaft.

If, for any reason whatever, the propeller shaft speed varies, this results in a change in the load distribution between alternators 8 and 11, the alternator rotating the most rapidly bearing a heavier load.

However, as it has been discussed above, the wattmeter relay 13 has for its effect to cause alternator 11 to operate at a constant load and, owing to the fact that the governor 14 for the turbine 10 has a high statism, it can be seen that turbine 10 modifies constantly its speed, so that the frequency of alternator 11 remains the same as that of alternator 8 which thereby assigns its frequency to the network.

Thus it can be seen how the loads are distributed between alternators 8 and 11, provided however that the speed variations in shaft 6 are not too important and, particularly that the Command is not compelled to reduce substantially the ship's speed, as for example by foggy weather.

Assuming this last assumption, i.e. when the speed of the propeller shaft 6 is reduced sufficiently so that the wattmeter governor 13 comes to the limit of its operation, said governor causes the circuit-breaker 5 to disengage, which immediately disconnects networks 1 and 3, network 1 remaining connected to alternator 8, while network 3 remains supplied by alternator 11 which operates at a constant speed, owing to the governor 14 of the turbine.

On the other hand, the frequency in network 1 diminishes and remains proportional to the speed of revolution of the propeller shaft 6.

However, as explained hereinabove, such reduction in the frequency is tolerable, since network 1 supplies only auxiliaries the output of which may be reduced without any disadvantage, along with the drop of the speed of revolution in the diesel propelling engine.

If the ship resumes soon after her normal running, it is only necessary to interconnect again both networks 1 and 3 by means of the circuit-breaker 5.

Conversely, should the reduced speed running be extended, the steam generation through the recovering of recited exhaust gases is reduced, and the steam turbine 10 is liable to be incapable of delivering the power necessary for the network 3. It is then only necessary to start the diesel auxiliary engine 15 and afterwards to connect alternator 16 to network 3 by means of switch 17.

In the case where the speed of the propeller shaft 6 is so reduced that the supply to network 1 becomes impossible, it is only necessary to open switch 9 and then to interconnect network 1 and network 3 by means of the circuit-breaker 5 and to start, if necessary, the diesel auxiliary engine 15a to drive the alternator 16a, which takes over the alternator 8.

The alternators 16 and 16a are also provided with wattmeter relays 18 and 18a, should the engines 15 and 15a be led to operate alone in parallel with alternator 8, which may possibly occur in the case, for example, where turbine 10 is out of order, for any reason whatever; then, the wattmeter relays 18 and 18a behave exactly as the wattmeter relay 13.

From the above description, it can be seen that the organization according to the present invention schematically shown in the drawings allows to supply a ship with an electrical energy having a frequency substantially constant by means of a device particularly simple.

While we have explained the principle of our invention and have illustrated what we now consider to represent its best embodiments, we desire to have it understood that, within the scope of the appended claims, the invention may be practiced otherwise than as specifically described.

What we claim is:

1. An arrangement for supplying an electrical load in part from a first alternator driven at a varying speed which cannot conveniently be regulated to suit the requirements of the load, said arrangement comprising a second alternator connected to supply said load in parallel with said first alternator, means for driving said second alternator, a high stability governor connected to control the speed-load characteristic of said driving means, and means responsive to the power delivered by one of said alternators connected to adjust said governor and thereby maintain the power delivered by said one alternator substantially constant.

2. An arrangement as claimed in claim 1 in which said first alternator has a high reactance.

3. An arrangement as claimed in claim 1 in which said power responsive means comprises a watt meter relay connected to the terminals of said second alternator.

4. An arrangement as claimed in claim 1 in which said power responsive means comprises a watt meter relay connected to the terminals of said first alternator.

5. An arrangement as claimed in claim 1 in which said first alternator is driven by the propeller driving engine of a ship and said second alternator is driven by a steam turbine.

6. An arrangement as claimed in claim 5 in which said load comprises two networks, each connected to one of said alternators, and connected to each other through a circuit breaker, said power responsive means being connected to open said circuit breaker when the speed of said first alternator falls below the lower limit of the range within which said governor can vary the speed of said second alternator.

7. An arrangement as claimed in claim 6 in which said propeller is driven by a diesel engine and said steam turbine operated by the steam produced by recovering the exhaust gases of said diesel engine.

References Cited in the file of this patent
UNITED STATES PATENTS

| 2,171,346 | Rosch | Aug. 29, 1939 |
| 2,872,591 | Stineman | Feb. 3, 1959 |

FOREIGN PATENTS

| 54,559 | France | Mar. 4, 1950 |